(12) United States Patent
Bader et al.

(10) Patent No.: US 8,275,507 B2
(45) Date of Patent: Sep. 25, 2012

(54) METHOD OF MONITORING A THRUST REVERSER

(75) Inventors: Nicholas Alain Bader, Vaux le Penil (FR); Thomas Deguin, Toulouse (FR); Xavier Regis Flandrois, Cesson (FR); Jean-Remi Andre Masse, Saint Cloud (FR); Mickael Yves Maurice Sauzedde, Croth (FR); Jean-Julien Camille Vonfelt, Niffer (FR)

(73) Assignee: SNECMA, Paris (FR)

( * ) Notice: Subject to any disclaimer, the term of this patent is extended or adjusted under 35 U.S.C. 154(b) by 338 days.

(21) Appl. No.: 12/728,641

(22) Filed: Mar. 22, 2010

(65) Prior Publication Data

US 2010/0242434 A1    Sep. 30, 2010

(30) Foreign Application Priority Data

Mar. 25, 2009    (FR) ...................................... 09 51916

(51) Int. Cl.
*G06F 7/00*    (2006.01)
(52) U.S. Cl. .................... 701/29.1; 60/226.2; 705/7.12; 705/7.25; 705/7.37

(58) Field of Classification Search ........................ None
See application file for complete search history.

(56) References Cited

U.S. PATENT DOCUMENTS

| | | | |
|---|---|---|---|
| 6,408,258 B1 | 6/2002 | Richer | |
| 7,987,108 B2 * | 7/2011 | Wetzer et al. | 705/7.12 |
| 2005/0075769 A1 | 4/2005 | Eschborn et al. | |

* cited by examiner

*Primary Examiner* — Luna Champagne
(74) *Attorney, Agent, or Firm* — Oblon, Spivak, McClelland, Maier & Neustadt, L.L.P.

(57) ABSTRACT

The method of the invention for monitoring a thrust reverser of a turbojet having an actuator controlled by an electric motor consists in determining a maintenance notice from a weighted combination of provisional notices, each provisional notice relating to a category of parameters associated with at least one phase of an operating cycle of the reverser, the category being selected from a category of parameters representative of a duration of said phase, of an energy seen by the motor during said phase, of a torque seen by the motor at a predefined instant of said phase, and of a duration during which the setpoint speed of rotation and the measured speed of rotation of the motor differ during said phase, each provisional notice being generated by analyzing values obtained during at least one cycle for at least one parameter of said category relative to a degradation threshold.

9 Claims, 7 Drawing Sheets

METHOD OF MONITORING A THRUST REVERSER

BACKGROUND OF THE INVENTION

The present invention relates to the general field of aviation.

It concerns more particularly monitoring thrust reversers of a turbojet, and in particular thrust reversers including an actuator that is controlled by an electric motor.

A preferred, but non-limiting application of the invention lies in the field of preventive maintenance for thrust reversers.

In known manner, a preventive maintenance operation consists in inspecting the thrust reverser before the occurrence of a failure that would prevent it from operating, such inspection possibly leading to one or more parts of the thrust reverser being replaced. Naturally, in order to be effective from a preventive point of view, and without generating pointless expense, such an operation must not be performed in untimely manner, but rather at an opportune moment in the lifetime of the thrust reverser.

There thus exists a need for a method of monitoring a thrust reverser effectively so as to deliver a maintenance notice that is reliable, thereby enabling maintenance operations on the reverser to be optimized.

OBJECT AND SUMMARY OF THE INVENTION

For this purpose, the invention provides a method of monitoring a thrust reverser of a turbojet, the reverser being actuated under the control of an electric motor, said method consisting in determining a maintenance notice for said thrust reverser on the basis of a weighted combination of a plurality of provisional maintenance notices, each relating to a category of parameters associated with at least one phase of an operating cycle of the thrust reverser, the category being selected from:
  a category of parameters representative of the duration of said phase;
  a category of parameters representative of the energy seen by the electric motor (i.e. generated by or delivered to the electric motor) during said phase;
  a category of parameters representative of a torque seen by the electric motor (i.e. generated by or delivered to the electric motor) at a predefined instant of said phase; and
  a category of parameters representative of a duration during which the setpoint speed of rotation for the electric motor differs from the speed of rotation of the motor as measured during said phase.

In accordance with the invention, each provisional notice relating to a parameter category is generated by analyzing values obtained during at least one operating cycle of the thrust reverser, for at least one identified parameter for said category, relative to a degradation threshold associated with said parameter.

Correspondingly, the invention also provides a device for monitoring a thrust reverser of a turbojet, the thrust reverser having an actuator that is controlled by an electric motor, and the device comprising:
  means for identifying at least one parameter for each category of a plurality of categories of parameters of at least one phase of an operating cycle of the thrust reverser, the categories being selected from:
    a category of parameters representative of the duration of said phase;
    a category of parameters representative of the energy seen by the electric motor during said phase;
    a category of parameters representative of a torque seen by the electric motor at a predefined instant of said phase; and
    a category of parameters representative of a duration during which the setpoint speed of rotation for the electric motor differs from the speed of rotation of the motor as measured during said phase;
  means for obtaining, for at least one operating cycle of the thrust reverser, values for identified parameters for each selected category;
  means for generating, for each selected category, a provisional maintenance notice by analyzing the values obtained for each identified parameter for said category relative to a degradation threshold associated with said parameter; and
  means for determining a maintenance notice for the thrust reverser on the basis of a weighted combination of the provisional maintenance notices generated for each selected category.

In the meaning of the invention, a maintenance notice (whether provisional or otherwise) comprises information indicating whether maintenance is recommended for the thrust reverser. By way of example, the information may be binary ("yes" for a positive notice, "no" for a negative notice). The maintenance notice may also include an estimate of the number of cycles remaining before a breakdown or a mechanical failure of the thrust reverser. Naturally, other forms of maintenance notice may be envisaged.

Furthermore, in the meaning of the invention, the term "weighted combination" of provisional notices means a combination in which a non-zero weight is applied to each provisional notice, e.g. by using combinational logic between the provisional notices.

Thus, the invention makes it possible to deliver a maintenance notice that is reliable since it combines a plurality of provisional notices generated using different approaches, i.e. relating to parameters of different categories. These parameter categories make it possible in particular to observe abnormal variation in mechanical friction in the thrust reverser and to detect problems in the electric motor of the actuator.

The invention thus provides effective monitoring of the thrust reverser while minimizing maintenance false alerts.

As examples:
  the category of parameters representative of a duration of at least one phase of an operating cycle of the thrust reverser comprises:
    the duration of the opening phase of said operating cycle of the thrust reverser; and
    the duration of the closing phase of said cycle;
  the category of parameters representative of energy seen by the electric motor during at least one phase of an operating cycle of the thrust reverser comprises:
    the total energy generated by the electric motor during an opening phase of the operating cycle, when operating in motor mode;
    the total energy generated by the electric motor during an opening phase of the operating cycle, when operating in generator mode;
    the total energy generated by the electric motor during a closing phase of the operating cycle, when operating in motor mode; and
    the total energy generated by the electric motor during a closing phase of the operating cycle, when operating in generator mode;

the category of parameters representative of torque seen by the electric motor at a predefined instant of at least one phase of an operating cycle of the thrust reverser comprises:
  at least one torque generated by the electric motor when the thrust reverser is at a predefined opening stage of the operating cycle; and
  at least one torque generated by the electric motor when the thrust reverser is at a predefined closing stage of the operating cycle;
the category of parameters representative of a duration during which the setpoint speed of rotation of the electric motor differs from the speed of rotation of the motor measured during at least one phase of an operating cycle of the thrust reverser comprises:
  the duration during which the setpoint speed of rotation of the electric motor differs from the speed of rotation of said motor as measured during the opening phase of the operating cycle; and
  the duration during which the setpoint speed of rotation of the electric motor differs from the speed of rotation of said motor as measured during the closing phase of the operating cycle.

In a particular implementation of the invention, the analysis for an identified parameter in a category comprises estimating the variation in the value of said parameter over successive operating cycles of the thrust reverser on the basis of values that have been obtained for said parameter.

The variation in the value of the parameter during successive operating cycles of the thrust reverser may be estimated in particular by using a linear or quadratic or even cubic regression method, as a function of requirements and as a function of the computing power available to the monitoring device.

According to a particular aspect of the invention, during the analysis, it is also determined whether, for a determined operating cycle of the thrust reverser, an estimated value or an obtained value for said parameter for said cycle crosses the degradation threshold associated with said parameter.

During analysis, if it is determined that an estimated value or an obtained value for the parameter for the determined operating cycle crosses the degradation threshold, then the number of operating cycles remaining for the thrust reverser to perform before reaching a breakdown threshold associated with the parameter may be estimated, once the degradation threshold has been crossed.

This number of cycles gives an indication of the urgency of maintenance, thus making it possible to weight the maintenance recommendation for this category.

This number of cycles may be obtained in particular on the basis of an estimate of the variation in the value of the parameter over successive operating cycles of the thrust reverser. This estimate, in particular when it is obtained using a linear or quadratic or cubic regression method, serves to predict the behavior of the thrust reverser and in particular the cycle during which a degradation threshold or a breakdown threshold will be crossed.

The breakdown and degradation thresholds associated with a parameter may be predefined.

In a particular implementation of the invention, a positive provisional maintenance notice is generated for a selected category if it is determined for the determined operating cycle that an estimated value or an obtained value for all the identified parameters for said category crosses the degradation threshold.

In a variant, different weighting may be applied to each parameter, e.g. it is possible to generate a positive provisional maintenance notice for a selected category if it is determined that for the operating cycle, an estimated value or an obtained value of at least one identified parameter for said category crosses the degradation threshold.

The provisional maintenance notice relating to a selected category may comprise estimating a number of operating cycles remaining for the thrust reverser until a breakdown appears, said number being obtained from numbers estimated for each identified parameter for said category presenting an estimated value or an obtained value that crosses the degradation threshold for the determined operating cycle.

In a variant embodiment, the variation in the value of a parameter over successive operating cycles of the thrust reverser is estimated from values obtained for said parameter under similar environmental conditions, said environmental conditions being representative of at least one variable selected from:
  the speed of rotation of the low pressure shaft of the turbojet;
  the speed of the aircraft fitted with the turbojet; and
  the temperature of the thrust reverser.

Thus, the maintenance notices that are generated take account of the environmental conditions in which the thrust reverser is to be found.

BRIEF DESCRIPTION OF THE DRAWINGS

Other characteristics and advantages of the present invention appear from the following description made with reference to the accompanying drawings that show an implementation having non-limiting character. In the figures.

DETAILED DESCRIPTION OF AN EMBODIMENT

Figure 1:
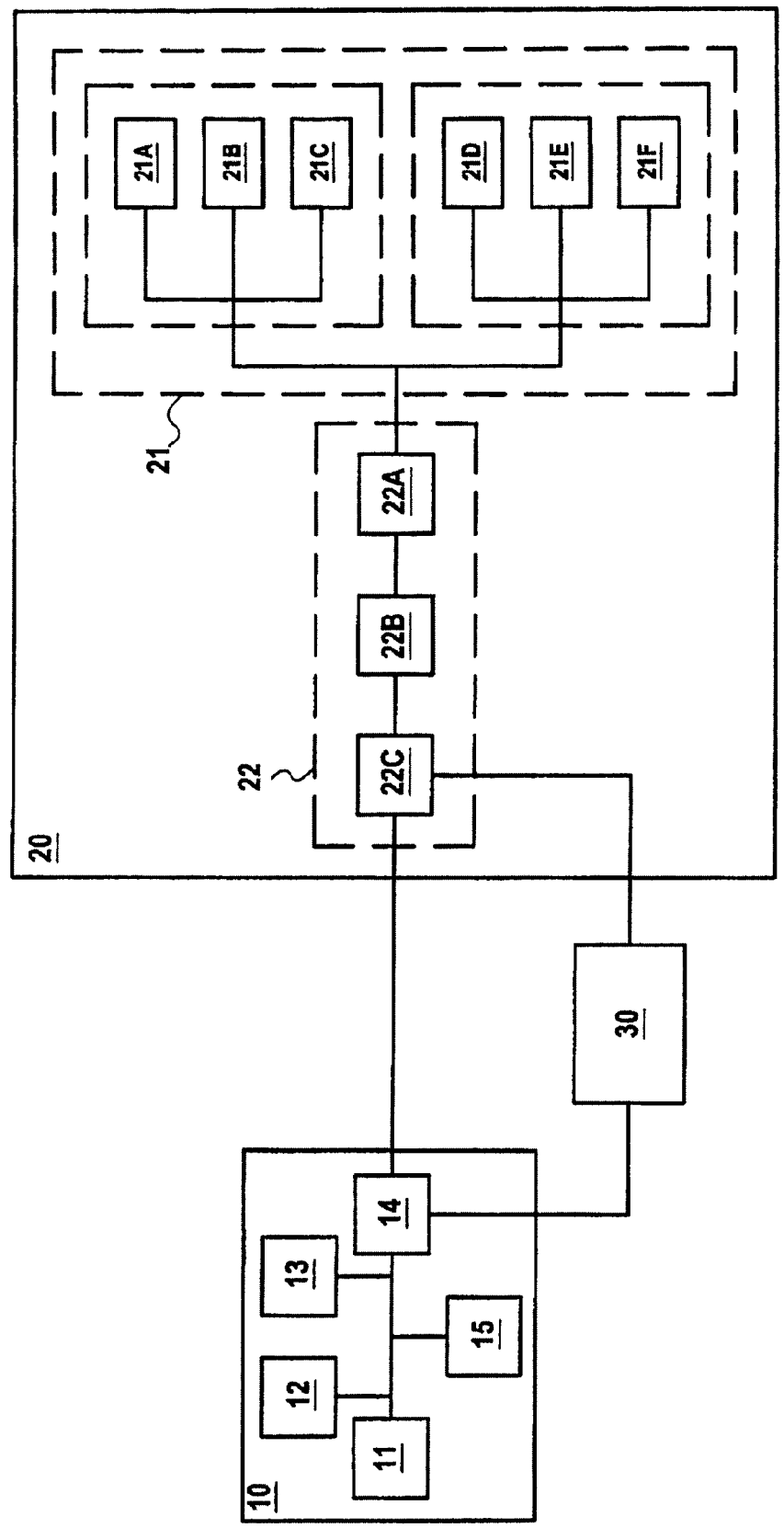
FIG. 1 is a block diagram showing a particular embodiment of a device in accordance with the invention for monitoring a thrust reverser of a turbojet, the reverser being actuated under the control of an electric motor.

FIG. 1 shows a particular embodiment of a monitoring device 10 in accordance with the invention for monitoring a thrust reverser, the device being shown in its environment.

In this embodiment, the monitoring device 10 is adapted to monitor a thrust reverser 20 that is actuated under the control of an electric motor and that is fitted to an aircraft turbojet.

In known manner, the thrust reverser 20 comprises two doors (not shown), each movable between a position for opening and a position for closing the reverser, the doors being moved under drive from at least one controlling actuator. In the example described, the thrust reverser 20 is fitted with an electromechanical actuator device 21 comprising six wormscrew actuators 21A-21F (three actuators per door) that are connected by means of flexible transmission shafts.

The thrust reverser 20 also includes a control system 22 provided with an electric motor 22A suitable for delivering mechanical energy to the actuator device 21 (via a mechanical transmission shaft) in order to activate opening or closing of the doors of the reverser.

The control system 22 also has a power module 22B, also referred to as a power electronics module, suitable for generating electrical power for feeding to the electric motor 22A. The power module is controlled by a control unit 22C fitted with computer means including in particular application software.

The actuator device 21 and the control system 22 are known to the person skilled in the art and are not described in greater detail herein. An example of a thrust reverser that is actuated under the control of an electric motor is described in particular in document EP 0 843 089.

The monitoring device 10 for monitoring the thrust reverser is embedded on board the aircraft in a data concentrator that takes charge of the maintenance algorithms for the aircraft.

In a variant embodiment, the monitoring device 10 is incorporated in the full authority digital engine control (FADEC) device 30 of the aircraft.

In another variant, the monitoring device 10 is embedded in a system on the ground.

Figure 2:
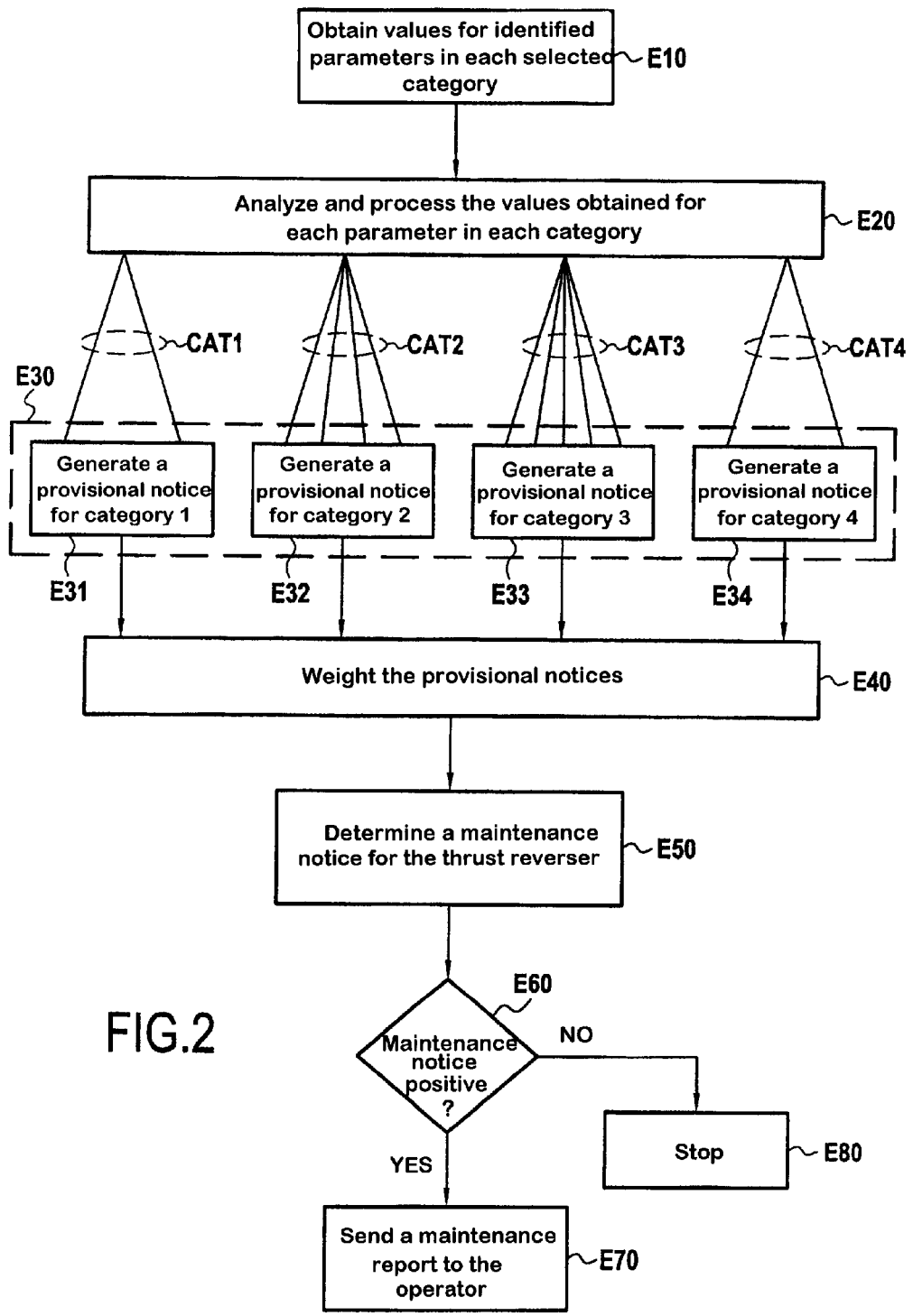
FIG. 2 is in the form of a flow chart showing the main steps of a particular implementation of a method of the invention for monitoring a thrust reverser when said method is implemented by the device shown in FIG. 1.

In the embodiment described herein, the monitoring device 10 presents the hardware architecture of a computer. In particular, it comprises a processor 11, random access memory (RAM) 12, and read only memory (ROM) 13. The ROM includes a computer program adapted to perform the main steps of the monitoring method of the invention, as represented in the form of a flow chart in FIG. 2, described below.

The monitoring device 10 also includes communications means 14 for communicating with equipments on board the aircraft, such as, for example, the control unit 22C or the FADEC 30.

The monitoring device 10, the FADEC 30, and the control unit 22C of the thrust reverser communicate with one another via a digital data bus or lines, known to the person skilled in the art.

The monitoring device 10 also includes communications means 15 for communicating with a server (not shown) of the operator of the aircraft. By way of example, these means comprise a network card for communicating over the Internet.

In the embodiment described, the thrust reverser 20 is monitored via a plurality of categories of parameters concerning the reverser, selected from:
- a category of parameters representative of a duration of at least one phase of an operating cycle of the thrust reverser, this category being referred to below as CAT1;
- a category of parameters representative of energy seen by the electric motor 22A (i.e. supplied to the motor 22A or generated by the motor 22A), during at least one phase of an operating cycle of the thrust reverser, which category is referred to below as CAT2;
- a category of parameters representative of a torque seen by the electric motor 22A (i.e. as supplied to the motor 22A or as generated by the motor 22A) at a predefined instant of at least one phase of an operating cycle of the thrust reverser, which category is referred to below as CAT3; and
- a category of parameters representative of a duration during which the setpoint speed of rotation of the electric motor differs from the measured speed of rotation of the motor during at least one phase of an operating cycle of the thrust reverser, which category is referred to below as CAT4.

In the meaning of the invention, an operating cycle of a thrust reverser comprises a reverser opening phase and a reverser closing phase. Thus, the term "phase" of an operating cycle is used herein to mean one or other of the opening and closing phases.

The four above-mentioned categories serve in particular to monitor variations in mechanical friction and/or mechanical efficiency in the thrust reverser over various operating cycles, thus making it possible to detect problems associated with the electric motor of the actuator. Nevertheless, other categories of thrust reverser parameters could be added to the four categories mentioned above, e.g. serving to monitor other aspects associated with the thrust reverser.

Furthermore, in the embodiment described herein, the thrust reverser is monitored by means of four categories. However, the invention is equally applicable when some smaller number of categories is selected from amongst the four categories (e.g. two categories).

For each selected parameter category, at least one parameter is identified that is associated with an operating cycle of the reverser.

More precisely, in this embodiment, for the category CAT1, two parameters are identified, namely the duration of the opening phase (parameter P1) and the duration of the closing phase (parameter P2) of the operating cycle.

For category CAT2, four parameters are identified:
- the total energy generated by the motor 22A during the opening phase of the reverser, while it is operating in motor mode (parameter P3);
- the total energy generated by the motor 22A during the opening phase of the reverser, while it is operating in generator mode (parameter P4);
- the total energy generated by the motor 22A during the closing phase of the reverser, while it is operating in motor mode (parameter P5); and
- the total energy generated by the motor 22A during the closing phase of the reverser, while it is operating in generator mode (parameter P6).

For category CAT3, five parameters P7-P11 are identified, corresponding respectively to the torques generated by the electric motor 22A while the thrust reverser 20 is at predefined opening and closing stages. In other words, each parameter P7 to P11 represents a torque generated by the electric motor 22A for a particular position (or in equivalent manner, a particular instant) during the opening or the closing of the thrust reverser.

These positions are previously determined on the basis of reference curves representing behavior that is normal in terms of the torque generated by the motor for a thrust reverser that is electromechanically actuated, such as the reverser 20. More precisely, these positions correspond to zones of relative stability in the observed torque (i.e. plateaus), as identified in the reference curves.

Thus, by way of example, consideration is given to:
- three torques (parameters P7, P8, and P9) for the opening stage corresponding to the torque generated by the motor 22A respectively when the thrust reverser is at 5%, 38%, and 96% of its open position; and
- two torques (parameters P10 and P11) for the closing stage corresponding to the torques generated by the motor 22A respectively when the thrust reverser is at 15% and 75% of its closed position.

These numerical examples are given purely by way of indication.

For the category CAT4, two parameters are identified, namely:

the duration during which the setpoint speed of rotation for the electric motor 22A differs from the measured speed of rotation of said motor, during the opening phase (parameter P12); and the duration during which the setpoint speed of rotation for the electric motor 22A differs from the measured speed of rotation of said motor, during the closing phase (parameter P13).

Two speeds of rotation are considered to be different when the difference between them is greater than a given threshold, e.g. 500 revolutions per minute (rpm).

Naturally, other parameters may be identified in each selected category, and the number of identified parameters in each category may be different from that proposed in this example.

With reference to FIGS. 2 to 6, there follows a description of the main steps of the monitoring method of the invention in a particular implementation that is implemented on the monitoring device 10 shown in FIG. 1 for monitoring the thrust reverser 20 while taking the above-mentioned parameters and the parameter categories into consideration.

After each operating cycle of the thrust reverser 20 (i.e. after the thrust reverser has closed), the monitoring device 10 obtains the values of the parameters P1 to P13 for the categories CAT1 to CAT4 (step E10). In the description below, the adjective "current" is used to designate the operating cycle of the thrust reverser that has just been completed, and also the parameter values for that cycle.

The current values of the parameters P1 to P13 are calculated in this example by the control unit 22C, in particular from measured data D, e.g. data measured by the control unit 22C or received from the FADEC 30 during the opening phase and the closing phase of the current operating cycle n. This data D comprises measurements of the position of the thrust reverser, of the speed of rotation of the electric motor 22A, and of the torque generated by said motor. The measurements are made using appropriate sensors that are themselves known. It should be observed that the data D may be used by other entities of the turbojet or of the aircraft, in the context of other applications.

Figure 3A:
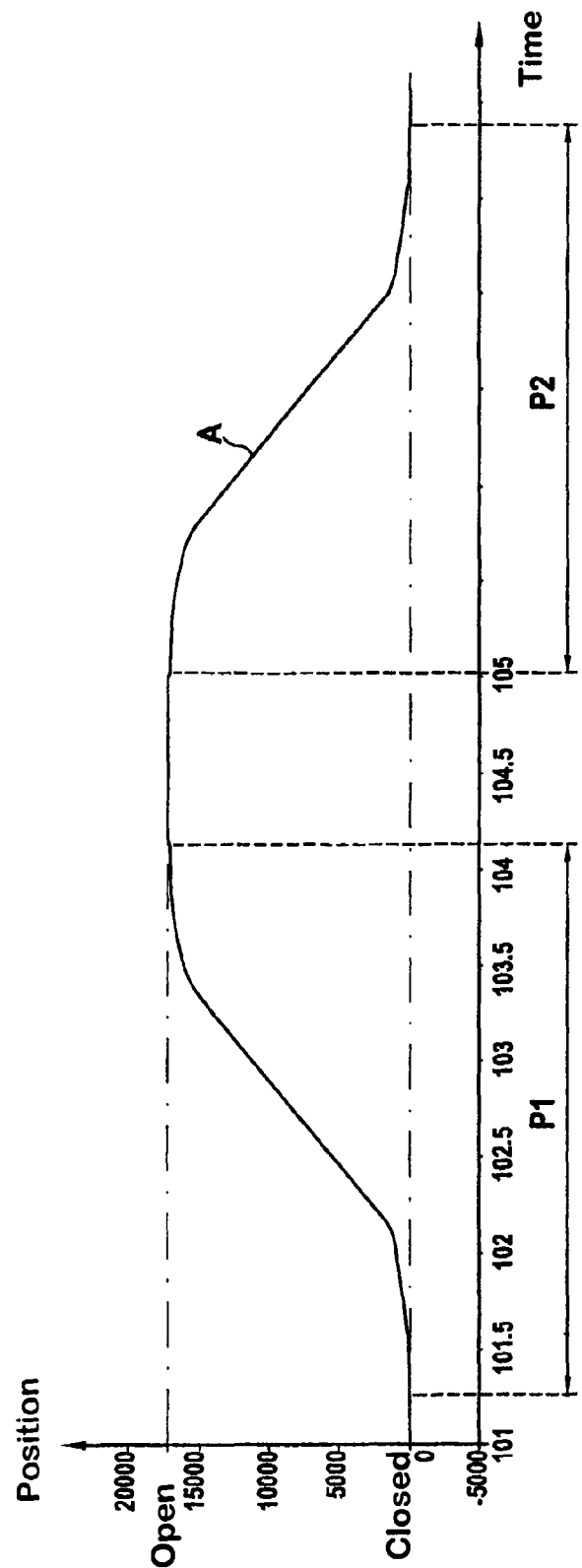
FIGS. 3A to 3C show examples of calculations on parameters observed during the monitoring method.
Figure 3B:
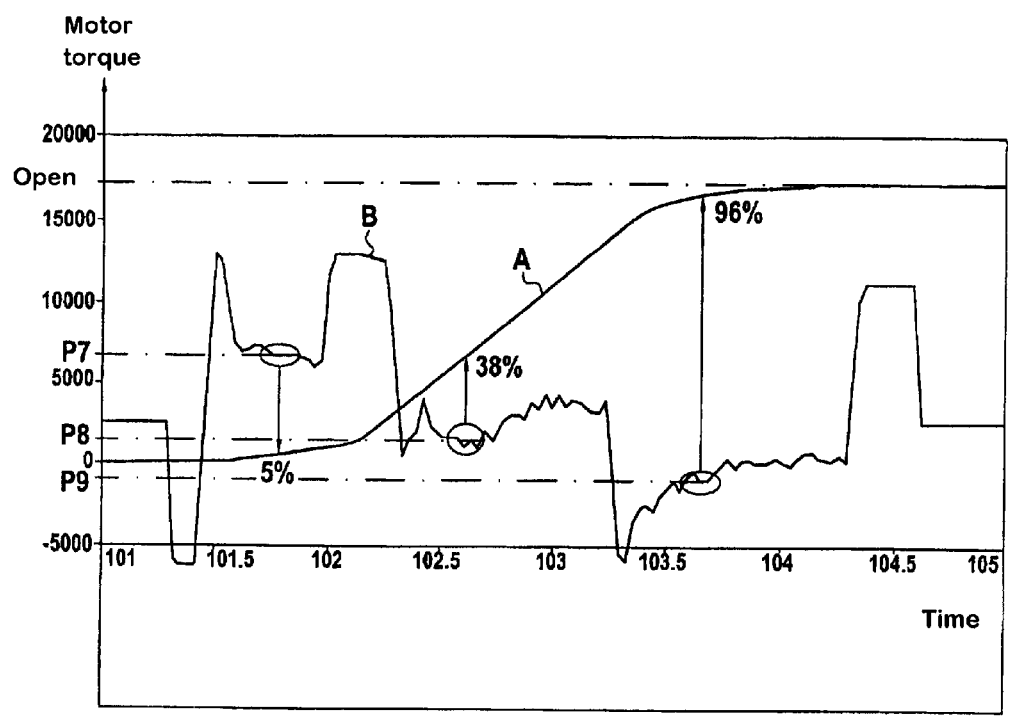
Figure 3C:
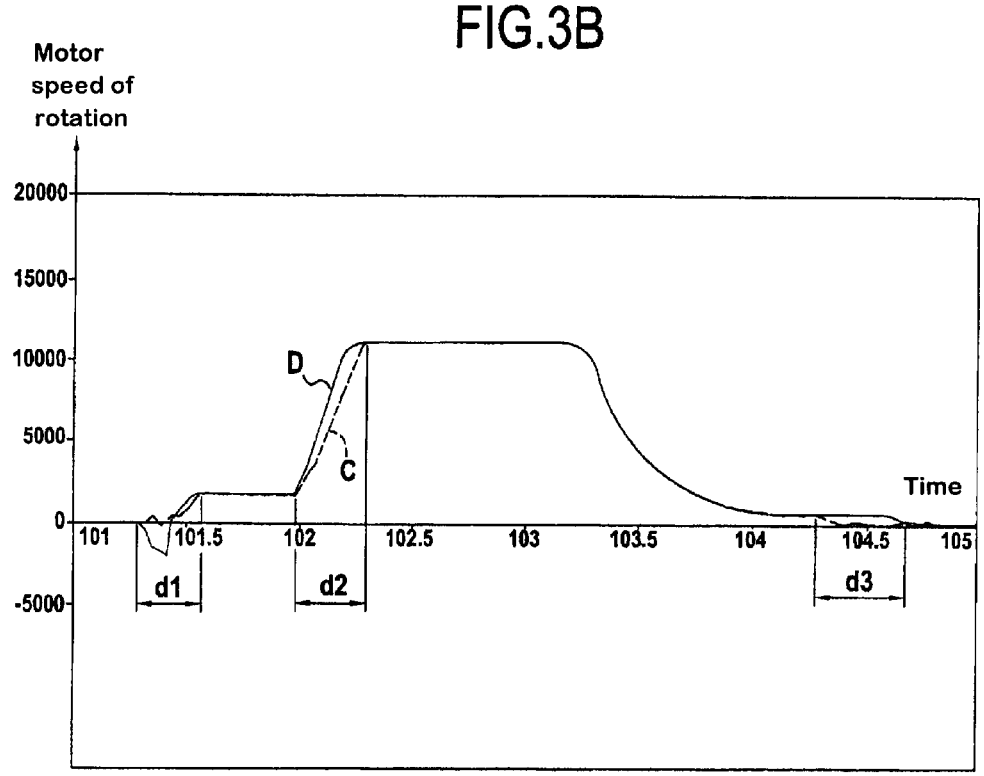

More precisely, the control unit 22C evaluates:

the parameters P1 and P2 from the position of the thrust reverser as a function of time. This calculation is illustrated in FIG. 3A, where the curve A represents variation in the position of the thrust reverser as a function of time for both the opening and the closing phases;

the parameters P3 to P6 from the speed of rotation of the electric motor 22A and the torque generated by the motor 22A;

the parameters P7 to P11 from the torque generated by the electric motor 22A. An example of this evaluation is shown in FIG. 3B for the opening phase (parameters P7 to P9). In this figure, curves A and B represent respectively variation in the position of the thrust reverser and in torque from the electric motor 22A as a function of time; and the parameters P12 and P13 from the speed of rotation of the electric motor 22A and a setpoint speed of rotation as generated by the control unit 22C, in known manner. The durations P12 and P13 are constituted by accumulating identified delays between these speeds, respectively during the opening phase and the closing phase. An example of how the parameter P12 is calculated is shown in FIG. 3C where the curves C and D represent respectively the variation in the setpoint speed of rotation and in the measured speed of rotation of the electric motor 22A as a function of time. In this example, the value of P12 is given by d1+d2+d3.

The current values of the parameters P1 to P13 are then delivered by the control unit 22C to the communications means 14 of the monitoring device 10 via a digital data bus.

In a variant, the current values of the parameters P1 to P13 may be calculated by some other device, e.g. by the FADEC 30, and then delivered to the monitoring device 10.

The monitoring device 10 then stores these values in tables that are contained in the RAM 12 (one table per parameter).

In the example described herein, these tables are three-dimensional tables so as to take account of the influence of environmental conditions on the operation of the thrust reverser. Thus, each dimension is associated with a different environmental variable. The following three environmental variables are envisaged herein:

the speed of rotation of the low pressure shaft of the turbojet fitted with the thrust reverser 20;

the speed of the aircraft; and the temperature of the thrust reverser.

In other words, the current values of the parameters P1 to P13 received by the monitoring device 10 are classified by the device in each table as a function of the environmental conditions associated with the current operating cycle n. These conditions are measured using appropriate sensors at the beginning of the operating cycle in known manner and they are delivered by the FADEC 30 to the monitoring device.

In a variant, it is naturally possible to take tables having an arbitrary number of dimensions into consideration, and also to take other environmental variables into consideration, such as for example the temperature of the turbojet nacelle averaged over a predetermined duration prior to the instructions to open the thrust reverser (e.g. 120 seconds (s)).

After storing data in this way, the monitoring device analyzes the values obtained for each parameter of each category separately (step E20).

Figure 4:
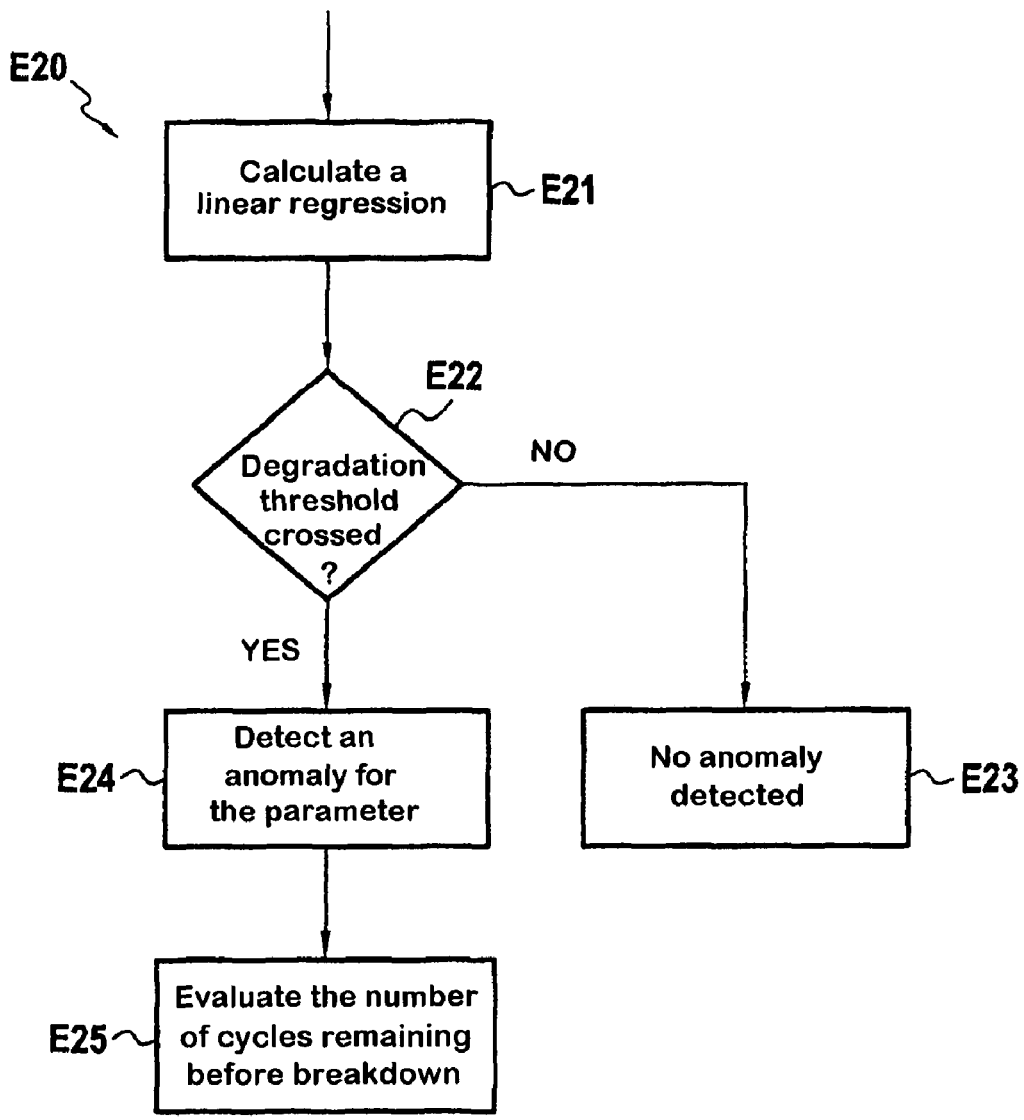
FIG. 4 is a flow chart showing the main steps implemented in a particular implementation of the invention while analyzing the values obtained for a parameter in the monitoring method of the invention.

FIG. 4 shows an example of the analysis performed by the monitoring device for a parameter P, where P is any one of the parameters P1 to P13.

From a received current value of the parameter P for operating cycle n, the device 10 calculates an estimate of the variation in the value of this parameter over successive operating cycles of the thrust reverser (step E21).

For this purpose, it uses a linear regression method, for example. In a variant, use of a quadratic or a cubic regression method may also be envisaged.

This linear regression is evaluated over all of the values stored in the table associated with the parameter P and corresponding to environmental conditions similar to those measured at the beginning of the current operating cycle. The term "similar" is used herein to mean situated within the same predefined range of values. The predefined range may correspond to a range for which the variance of the observed values of the parameters is small.

Figure 5:
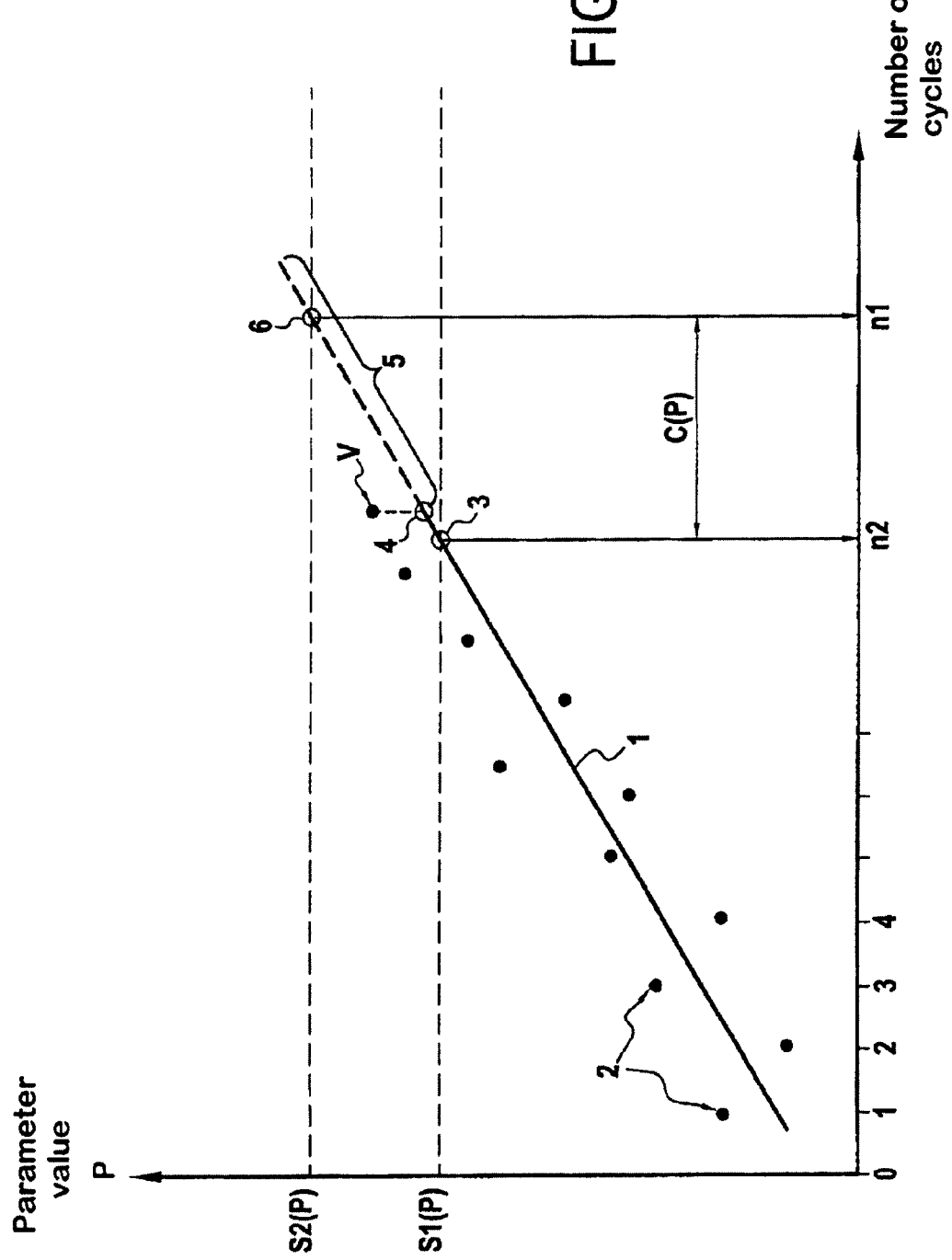
FIG. 5 is an example of a diagram representing estimated variation in the values of a parameter P as a function of the number of operating cycles of the thrust reverser.

FIG. 5 shows an example of a linear regression curve 1 evaluated from values 2 of a parameter P, these values being obtained for successive cycles of the thrust reverser, under similar environmental conditions. The curve 1 is a curve of estimated values for the parameter P in the meaning of the invention. It comprises in particular an estimated value 4 and the current value V of the parameter P, as obtained for the current operating cycle n.

The monitoring device 10 then examines whether a degradation threshold S1(P) associated with the parameter P has been crossed. To do this, it compares the estimated value 4 with the degradation threshold S1(P) (step E22). In a variant, the monitoring device may compare the value that is obtained V with the degradation threshold S1(P), instead of comparing the estimated value 4 therewith.

The degradation threshold S1(P) is set beforehand, e.g. by the operator of the aircraft as a function of the operator's requirements and expectations in terms of maintenance. The threshold S1(P) is selected so as to enable maintenance to be performed on the thrust reverser 20 before it breaks down or is subjected to mechanical failure. A different degradation threshold may be considered for each parameter within a given category.

If the threshold S1(P) has not been crossed by the estimated value 4, then the monitoring device 10 considers that no anomaly is to be taken into consideration for the parameter P (step E23). The value V of the parameter P for cycle n is considered to be normal.

In contrast, if the threshold S1(P) is crossed by the estimated value 4 (as can be seen for example in FIG. 5 where the estimated value 4 is above the threshold S1(P)), then the monitoring device 10 detects an anomaly for the parameter P (step E24). In other words, the value of the parameter P is considered as being abnormally high for cycle n.

Under such circumstances, the monitoring device 10 also estimates the number C(P) of operating cycles that can be performed by the thrust reverser 20 until it crosses a breakdown threshold S2(P) associated with the parameter P.

The breakdown threshold S2(P) is set beforehand, e.g. by the aircraft operator. It represents a value for the parameter P beyond which a breakdown or a mechanical failure is to be expected in the thrust reverser 20. It is possible to take into consideration a different breakdown threshold for each parameter of a given category.

With reference to FIG. 5, in order to calculate this number C(P), the monitoring device 10 uses the curve 1 of estimated values for the parameter P as a curve for predicting the values of the parameter as from the degradation threshold (the portion of the curve 1 given reference 5 in the figure).

This prediction curve enables the monitoring device to estimate the operating cycle n1 at which the breakdown threshold S2(P) will be crossed (point 6), and also the operating cycle n2 corresponding to the degradation threshold being crossed. The monitoring device then deduces the number C(P) between n1 and n2 on the basis of the following relationship:

$$C(P)=\lfloor n1-n2 \rfloor$$

where $\lfloor n1-n2 \rfloor$ designates the integer immediately less than the number n1-n2.

Once this analysis has been performed for each parameter P1 to P13, the monitoring device generates a provisional notice for each parameter category CAT1-CAT4 (step E30). Thus, it generates a provisional notice PN1 for the category CAT1 (step E31), a provisional notice PN2 for the category CAT2 (step E32), a provisional notice PN3 for the category CAT3 (step E33), and a provisional notice PN4 for the category CAT4 (step E34).

For this purpose, in the implementation described herein, it examines whether an anomaly has been detected for each parameter of a category, and where appropriate generates a positive provisional maintenance notice for this category. A positive provisional notice generated for a category means that given the parameters observed in said category, the monitoring device 10 recommends performing a maintenance operation on the thrust reverser 20.

Thus, for category CAT1, for example, the monitoring device 10 examines whether an anomaly has been detected for the parameter P1 and for the parameter P2. If this is the case, the monitoring device 10 generates a positive provisional notice PN1 for the category CAT1. If no anomaly has been observed for one or both parameters of category CAT1, then the monitoring device 10 generates a negative provisional notice PN1 for the category CAT1.

It should be observed that the provisional maintenance notice relating to a category may be generated using different weighting applied to the parameters of said category, and the weighting may vary from one category to another.

For example, for the category CAT2, a positive provisional maintenance notice PN2 may be generated if an anomaly is detected on the parameters P3 and P5 or if an anomaly is detected on the parameters P2 and P4.

The provisional maintenance notice generated for a category may also include, if positive, an estimate of the number of cycles that remain until a breakdown appears. For example, this number may be taken to be the smallest of the numbers C(P) estimated for the parameters of the category under consideration.

From the provisional notices PN1-PN4 relating respectively to the categories CAT1 to CAT4, the monitoring device 10 generates a "final" maintenance notice FN for the thrust reverser 20 (step E50). This final maintenance notice FN indicates whether a maintenance operation on the thrust reverser 20 is finally recommended, given the observed parameter categories.

In order to determine the notice FN, the monitoring device 10 combines the provisional notices PN1, PN2, PN3, and PN4 while applying non-zero weighting to each of those notices. In other words, it takes account of all of the provisional notices in order to generate the final maintenance notice FN.

Figure 6:
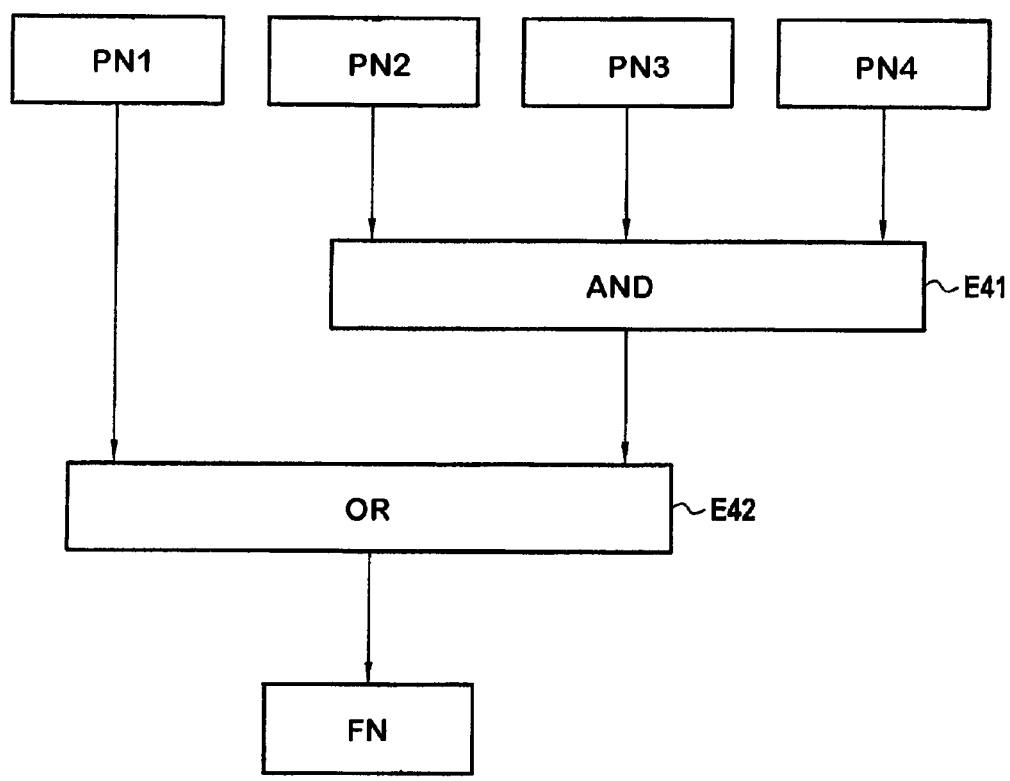
FIG. 6 shows an example of a weighted combination of provisional notices relating to four categories of parameter.

This weighting is applied using combinational logic. An example of one such combination is shown in FIG. 6.

In this example, the notices PN2, PN3, and PN4 are combined initially using a logic AND function (step E41). Thereafter, the result of this logic function is combined with the provisional notice PN1 using a logic OR function (step E42). In a manner known to the person skilled in the art, these combinations can be implemented simply with the help of logic gates.

In other words, in this example, greater weight is given to the parameter category CAT1. Conversely, a positive provisional maintenance notice for category CAT2 needs to be confirmed by a positive provisional notice for the category CAT3 and a positive provisional notice for the category CAT4.

Naturally, other weighting values could be envisaged, as could other types of weighting.

If the final maintenance notice FN is positive (test of step E60), then the monitoring device 10 sends an aircraft conditioning monitoring function (ACMF) report to the operator of the aircraft recommending that maintenance be undertaken, the report being sent with the help of the communications means 15 (step E70).

If the final maintenance notice FN is negative, then no report is sent (step E80).

What is claimed is:

1. A method of monitoring a thrust reverser of a turbojet, the reverser being actuated under the control of an electric motor, said method consisting in determining, using a processor, a maintenance notice for said thrust reverser on the basis of a weighted combination of a plurality of provisional maintenance notices, each relating to a category of parameters associated with at least one phase of an operating cycle of the thrust reverser, the category being selected from:

a category of parameters representative of a duration of said phase;

a category of parameters representative of energy seen by the electric motor during said phase;

a category of parameters representative of a torque seen by the electric motor at a predefined instant of said phase; and a category of parameters representative of a duration during which a setpoint speed of rotation for the electric motor differs from a speed of rotation of the motor as measured during said phase;

each provisional notice relating to a parameter category being generated by analyzing values obtained during at least one operating cycle of the thrust reverser, for at least one identified parameter of said category, relative to a degradation threshold associated with said parameter, wherein the analysis for an identified parameter in a category comprises estimating a variation in the value of said parameter over successive operating cycles of the thrust reverser on the basis of values that have been obtained for said parameter, wherein during the analysis, it is also determined whether, for a determined operating cycle of the thrust reverser, an estimated value or an obtained value for said parameter for said cycle crosses the degradation threshold associated with said parameter, and wherein during analysis, if it is determined that the estimated value or the obtained value for the parameter for the determined operating cycle crosses the degradation threshold, then the number of operating cycles remaining for the thrust reverser to perform before reaching a breakdown parameter associated with the parameter is estimated, once the degradation threshold has been crossed.

2. The method according to claim 1, wherein a positive provisional maintenance notice is generated for a selected category if it is determined for the determined operating cycle that the estimated value or the obtained value for all the identified parameters for said category crosses the degradation threshold.

3. The method according to claim 2, wherein the provisional maintenance notice relating to a selected category comprises estimating a number of operating cycles remaining for the thrust reverser until a breakdown appears, said number being obtained from numbers estimated for each identified parameter for said category presenting the estimated value or the obtained value that crosses the degradation threshold for the determined operating cycle.

4. The method according to claim 1, wherein the variation in the value of a parameter over successive operating cycles of the thrust reverser is estimated from values obtained for said parameter under similar environmental conditions, said environmental conditions being representative of at least one variable selected from:

the speed of rotation of the low pressure shaft of the turbojet;

the speed of the aircraft fitted with the turbojet; and the temperature of the thrust reverser.

5. The method according to claim 1, wherein the variation in the value of a parameter during successive operating cycles of the thrust reverser is estimated from values obtained for said parameter by using a regression method.

6. The method according to claim 1, wherein the category of parameters representative of a duration of at least one phase of an operating cycle of the thrust reverser comprises:

a duration of an opening phase of said operating cycle of the thrust reverser; and a duration of a closing phase of said cycle.

7. The method according to claim 1, wherein the category of parameters representative of energy seen by the electric motor during at least one phase of an operating cycle of the thrust reverser comprises:

a total energy generated by the electric motor during an opening phase of the operating cycle, when operating in motor mode;

a total energy generated by the electric motor during an opening phase of the operating cycle, when operating in generator mode;

a total energy generated by the electric motor during a closing phase of the operating cycle, when operating in motor mode; and a total energy generated by the electric motor during a closing phase of the operating cycle, when operating in generator mode.

8. The method according to claim 1, wherein the category of parameters representative of the torque seen by the electric motor at a predefined instant of at least one phase of an operating cycle of the thrust reverser comprises:

at least one torque generated by the electric motor when the thrust reverser is at a predefined opening stage of the operating cycle; and at least one torque generated by the electric motor when the thrust reverser is at a predefined closing stage of the operating cycle.

9. The method according to claim 1, wherein the category of parameters representative of a duration during which the setpoint speed of rotation of the electric motor differs from the speed of rotation of the motor measured during at least one phase of an operating cycle of the thrust reverser comprises:

a duration during which the setpoint speed of rotation of the electric motor differs from the speed of rotation of said motor as measured during an opening phase of the operating cycle; and a duration during which the setpoint speed of rotation of the electric motor differs from the speed of rotation of said motor as measured during a closing phase of the operating cycle.

* * * * *